United States Patent [19]

Bielagus et al.

[11] Patent Number: 5,415,515
[45] Date of Patent: May 16, 1995

[54] GARBAGE BAG OPENER

[75] Inventors: Joseph B. Bielagus, Tualatin, Oreg.; Raymond W. Campbell, Beloit, Wis.

[73] Assignee: Beloit Technologies, Inc., Wilmington, Del.

[21] Appl. No.: 156,122

[22] Filed: Nov. 22, 1993

Related U.S. Application Data

[63] Continuation of Ser. No. 855,812, Mar. 23, 1992, abandoned.

[51] Int. Cl.⁶ .............................................. B02C 23/02
[52] U.S. Cl. .................................. 414/412; 414/411; 241/193; 241/194; 209/3; 83/435.2
[58] Field of Search ................... 30/247, 345; 83/225, 83/435.2, 401; 225/97; 241/193; 209/3; 414/403, 411, 412, 194, 195

[56] References Cited

U.S. PATENT DOCUMENTS

| | | |
|---|---|---|
| 3,891,105 | 6/1975 | Cerroni . |
| 4,067,506 | 1/1978 | Cerroni . |
| 4,119,227 | 10/1978 | Hafner et al. ........................ 414/412 |
| 5,188,500 | 2/1993 | Eide et al. ........................ 241/193 X |

FOREIGN PATENT DOCUMENTS

| | | |
|---|---|---|
| 1432564 | 2/1966 | France . |
| 2307634 | 11/1976 | France . |
| 1297550 | 6/1969 | Germany ............................. 414/412 |
| 2556044 | 6/1976 | Germany ............................. 414/412 |
| 8303265 | 4/1985 | Netherlands . |
| 1535305 | 12/1974 | United Kingdom . |
| 2062497 | 5/1981 | United Kingdom ................. 241/194 |
| 628035 | 10/1978 | U.S.S.R. ............................... 414/412 |
| 825379 | 4/1981 | U.S.S.R. ............................... 414/412 |
| 1013356 | 4/1983 | U.S.S.R. ............................... 414/412 |

Primary Examiner—Frank E. Werner
Attorney, Agent, or Firm—Dirk J. Veneman; Raymond W. Campbell

[57] ABSTRACT

An opening device for opening bagged refuse to liberate the contents of the bag, in which garbage bags are transported along a conveyor, and a plurality of endless chains having tines attached thereto are operated above the conveyor. As bags pass under the endless chains, tines extending downwardly from the chains pierce the garbage bags. Adjacent chains are operated at different speeds, and the tines move at different speeds relative to the conveyor, tearing the bags, liberating the refuse.

6 Claims, 1 Drawing Sheet

GARBAGE BAG OPENER

This is a continuation of application Ser. No. 07/855,812, filed on Mar. 23, 1992, now abandoned.

BACKGROUND OF THE INVENTION

1. Technical Field

The present invention relates generally to municipal waste processing systems, and relates more specifically to an apparatus for opening garbage bags in a municipal waste processing stream, to liberate the contents of the bags prior to subsequent treatment of the waste.

2. Prior Art

The refuse from individuals and businesses alike frequently is accumulated in plastic garbage bags which are secured closed, in some fashion, and left for pick-up and hauling to disposal sites. For collection and handling of refuse, the plastic garbage bag needs to be burst and tear resistant. If easily burst or torn, the bag may be ripped open by the contents contained therein, either while the contents are being deposited in the bag or while the bag is being carried from one location to another prior to the final pickup for hauling to disposal. Since the refuse contained in a garbage bag will normally include a mixture of hard and soft articles, some with pointed ends or relatively sharp edges, garbage bags are frequently designed to stretch or break slightly, without substantial tearing, and tear propagation is minimized. Frequently the tear strength is sufficient such that the bags are not opened even by the mechanical compaction applied thereto in the final collecting equipment, such as a garbage truck.

When municipalities were allowed to landfill the entire volume of collected municipal waste, the tear or burst resistance of garbage bags was of little or no concern. However, with decreasing capacities in existing landfills, the unavailability of additional landfill sites, the increasing costs for landfill operation and the enactment of environmental laws making recycling desirable and even mandatory, many municipalities have installed municipal waste processing systems which separate the components of the municipal waste for subsequent processing such as burning, recycling, or other handling. In such systems, it is necessary to liberate the contents from containers such as garbage bags, so that the necessary separating and treating steps can be performed on the various different articles in the refuse.

It was common in early municipal waste processing systems to merely shred the municipal waste in hammer mills, or other comminuting devices. The result was that the bags were opened and contents liberated; however, the contents themselves were shredded or pulverized. Pieces of the garbage bags can plug the devices, blind the hammers or other implements and otherwise foul the apparatus, reducing its efficiency.

Trommel screens have also been utilized for liberating contents from garbage bags, which screens comprise a large tilted drum in which the bags are tumbled. While these have been somewhat successful in liberating the contents of the bags, due to the tumbling action, frangile containers break, and all bags are not uniformly opened.

In many present municipal waste processing systems, it is desirable to minimize the degree of shredding which occurs prior to separation. Therefore, it is desirable to provide a garbage bag opening device which will tear the bags for opening and liberating refuse without shredding, crushing or significantly breaking the contents in the bags.

A device intended for gentle garbage bag opening is disclosed in U.S. Pat. No. 4,479,581 "Apparatus and Method for Processing Bagged Refuse" wherein a disk screen is used for bag opening, with a bag breaking means consisting of disk assemblies operating above the screen bed to open the bags. The disks have serrated or toothed edges, to help in bag opening and content liberation. However, since the bags are torn and not shredded, it is common that the large, opened plastic bags will wrap around the disks, thereby limiting future effectiveness of the disks in bag opening. Other types of bag openers suffer similar plugging or blinding problems.

It is, therefore, an object of the present invention to provide an apparatus for opening garbage bags, to liberate the contents of the garbage bags, which is effective in operation to liberate the waste, yet minimizes breaking or size reduction of the liberated material.

Another object of the present invention is to provide a garbage bag opener which is self-cleaning and reduces blinding from the municipal waste contained in a municipal waste stream.

Still another object of the present invention is to provide a garbage bag opener which is not easily damaged by large and hard articles contained in the municipal waste stream and which is simple, yet effective in operation.

Yet another object of the present invention is to provide a garbage bag opener which is inexpensive to build and install and adaptable to different garbage stream conditions.

SUMMARY OF THE INVENTION

The above and other objects are achieved in the present invention by providing a garbage bag opening device operating above a conveyor or other transport device for a municipal waste stream. The device includes a plurality of endless chains having ripping elements attached thereto. The ripping elements from adjacent chains puncture the garbage bags positioned in their path. Adjacent chains move at different speeds such that the relative distance between any pair of ripping elements on adjacent chains is continually changing.

Additional objects and advantages of the present invention will become apparent from the detailed description and the accompanying drawings.

DETAILED DESCRIPTION OF THE PREFERRED EMBODIMENT

Figure 1:
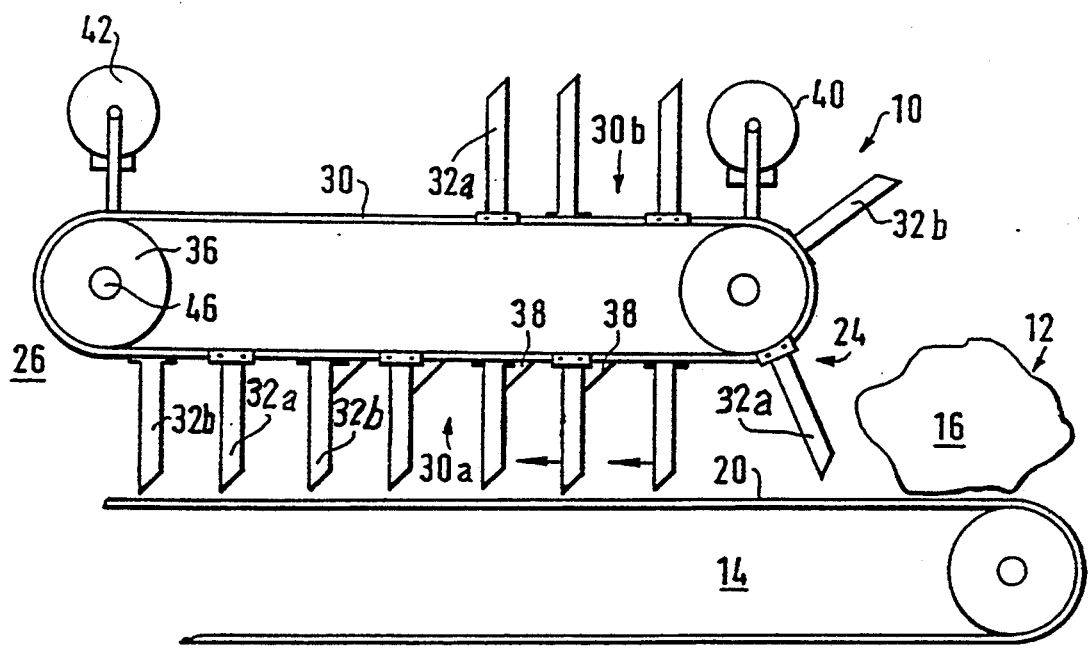
FIG. 1 is an elevational schematic representation of a garbage bag opener of the present invention.
Figure 2:
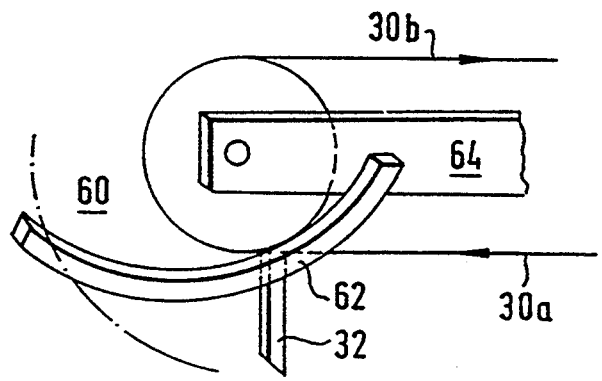
FIG. 2 is a schematic representation of the outlet and of the garbage bag opener.

Referring now more specifically to the drawings, and to FIG. 1 in particular, numeral 10 designates a garbage bag opener embodying the present invention, the opener being shown operating on a municipal waste stream 12 being carried on a conveyor 14. The opener 10 operates along the full width of the conveyor 14, so that all bags 16 are treated by the device for liberating the contents from the bags.

The conveyor 14 includes a bed 20 on which the municipal waste is supported and transported. The conveyor is of conventional design, and may include side retaining walls or the like. The design of such a conveyor is familiar to those knowledgeable in the art and will not be described in further detail herein. Various types of conveyors, slides, chutes, or the like may be used, and the garbage bag opener of the present invention may be used in conjunction therewith.

The garbage opener of the present invention has an inlet end 24 and an outlet end 26, and includes a plurality of endless chains 30, each having a plurality of ripping elements or tines 32 attached thereto. The endless chain 30 is preferably a roller chain or the like entrained about sprockets 34 and 36 at the inlet and outlet ends, respectively. It should be recognized that other types of drive belts or the like may also be used. The sprockets are positioned substantially perpendicular to the surface of the conveyor and provide a lower treatment path 30a in which the tines move codirectionally with the conveyor, and an upper return path 30b bringing the tines back toward the inlet end.

The ripping elements or tines 32 may be rod-like or bar-like elements, and will preferably have a somewhat sharpened or pointed end to facilitate piercing the garbage bags or other containers holding refuse in the municipal waste stream. The tines extend from the chain 30 to near the surface of conveyor bed 20 in the treatment path 30a, such that even relatively flat bags on the bed 20 will be punctured by the tines as the bags pass beneath the opener 10. Gussetts 38 may be used to strengthen the tines against undo deflection.

As mentioned previously, a plurality of the endless chains 30 is provided, each chain with its tines operating in substantial parallelism with the other chains. The chains are spaced from each other across the width of the conveyor, and extend from the inlet end to the outlet end. For driving the chains in their paths about the sprockets 34 and 36, the chains are divided into sets, with every other chain across the width of the conveyor being commonly driven. Separate drive means, such as motors 40 and 42, are provided. While the sprockets 34 and 36 for each endless chain 30 may be commonly disposed on shafts 44 and 46, respectively, every-other sprocket will be drivingly attached to the shaft, while the alternate sprockets are disposed on the shaft by bearings, and freely rotational with respect to the shaft. In this manner, one set of endless chains is driven by the motor 40, while the other set of endless chains is driven by the motor 42.

The motors, through appropriate drive mechanisms 40a and 42a including conventional speed reducing drive means are operated such as to drive the different sets of endless chains at different speeds such that the distance between adjacent tines 32A and 32B of adjacent endless chains 30 is continuously varying during operation of the opener.

While the tines 32 are preferably smooth and present a minimal surface area such that little or no refuse will cling to the elements, it may happen that some pieces do wrap or attach to the tines, or that the tines may puncture a piece of refuse which will then cling thereto. To remove any articles clinging to the tines, a scraper mechanism 60 is provided, operating closely adjacent the tines at the outlet end 26 of the opener. A rod or bar 62 is attached to a frame member 64, and is arcuately or angularly disposed such that it crosses the inner most end of a tine at an upstream position, and extends angularly outwardly across the path of the tine to the outer most edge of the tine at a downstream position of the path of travel of the tine. In this way, as the tines travel along their path and pass past the rod or bar 62, articles attached to the tines will be scraped from the inner end of the tine towards the outer end of the tine and off the end of the tine.

In the preferred construction, a scraper mechanism 60 is provided on each side of each endless chain 30, so that the tines are scraped simultaneously on opposite sides. While a rod or bar 62 is shown, the scraping function also can be performed by the edge of a plate, a housing or the like properly positioned.

In the use and operation of a garbage bag opener in accordance with the present invention, a waste stream of municipal waste is transported along conveyor 12 toward the garbage bag opener 10. As the bags pass under the inlet end 24 of the opener, tines traveling around the sprockets 34 approach downwardly from above garbage bags 14. The tines pierce the bag, puncturing it to near the bottom of the bag. Two, three or more tines may puncture each bag, some tines of which will be from different endless chains. Since adjacent endless chains are driven at different speeds, tines from adjacent chains which have punctured the same bag 16 will move through the bag at different speeds, thereby ripping and tearing the bag and liberating the material contained in the bag.

As the bag approaches the outlet end 26, much of the material contained in the bag will have fallen out of the bag and will have been spread across the conveyor. As the tines move upwardly around sprocket 36, and approach the scraper mechanism 60, most material will fall away from the tines; however, material which has clung to or been impaled by the tines will be scraped from the tines by the scraper mechanism.

The present garbage bag opener provides many advantages over other types of openers used previously. The manner of opening is gentle, such that frangible articles contained in the refuse are not commonly broken and can be treated as necessary for later separation. If large, bulky, or particularly hard items are contained in the refuse stream, the tines mounted on chains can deflect slightly, so as not to be damaged by the hard articles, and the hard article itself can be moved slightly, such that the tines will deflect along the side of the article. In this manner, the potential for damage to the opener is substantially reduced.

We claim:

1. An opening device for opening refuse containing bags, to liberate the refuse from the bags, said opener comprising:

conveying means for transporting the bags to be opened from an inlet end of the device to an outlet end of the device and for supporting the bags to be opened in position for opening;

first and second rigid, yieldably mounted tine means disposed above said conveying means and minimally spaced there from, each of said tine means including an endless chain and a plurality of tines attached thereto, said tines having ends adapted for piercing the bags being transported and supported on said conveying means; and drive means for operating said tine means co-directionally with said conveying means and moving said first and second tine means at different speeds for effecting relative movement between said first and second tine means operable to cause an increase in spacing between tines of said first tine means and of said second tine means having pierced a bag, thereby ripping the bag and liberating material from the bag.

2. An opening device as defined in claim 1, in which said first and second tine means travel in substantially parallel paths at said different speeds.

3. An opening device as defined in claim 2, in which a scraper means is provided for removing material clinging to said tines.

4. An opening device as defined in claim 3, in which said scraper means extends angularly across the path of tine travel from inner ends of the tines to outer ends of the tines, in the direction of tine travel.

5. An opening device as defined in claim 1, in which a scraper means is provided for removing material clinging to said tines.

6. An opening device as defined in claim 5, in which said scraper means extends angularly across a path of tine travel from inner ends of the tines to outer ends of tines, in a direction of travel.

* * * * *